United States Patent
Ramzan et al.

(10) Patent No.: US 9,465,921 B1
(45) Date of Patent: Oct. 11, 2016

(54) SYSTEMS AND METHODS FOR SELECTIVELY AUTHENTICATING QUERIES BASED ON AN AUTHENTICATION POLICY

(75) Inventors: Zulfikar Ramzan, Cupertino, CA (US); Walter Bogorad, Danville, CA (US)

(73) Assignee: Symantec Corporation, Mountain View, CA (US)

( * ) Notice: Subject to any disclaimer, the term of this patent is extended or adjusted under 35 U.S.C. 154(b) by 1260 days.

(21) Appl. No.: 12/436,630

(22) Filed: May 6, 2009

(51) Int. Cl.
*H04L 29/06* (2006.01)
*G06F 21/00* (2013.01)

(52) U.S. Cl.
CPC .................................... *G06F 21/00* (2013.01)

(58) Field of Classification Search
USPC .......................................................... 726/3
See application file for complete search history.

(56) References Cited

U.S. PATENT DOCUMENTS

| | | | | |
|---|---|---|---|---|
| 5,465,387 A * | 11/1995 | Mukherjee | ............ | H04M 15/00 380/250 |
| 6,108,583 A * | 8/2000 | Schneck | ............... | H04L 63/105 700/67 |
| 6,842,860 B1 * | 1/2005 | Branstad | .................. | H04L 9/12 713/166 |
| 2004/0003283 A1 * | 1/2004 | Goodman | ............ | G06Q 10/107 726/30 |
| 2004/0187024 A1 * | 9/2004 | Briscoe | .................. | H04L 63/08 726/29 |
| 2005/0080857 A1 * | 4/2005 | Kirsch et al. | ................. | 709/206 |
| 2005/0097320 A1 * | 5/2005 | Golan | ..................... | G06F 21/40 713/166 |
| 2005/0108551 A1 * | 5/2005 | Toomey | ........................ | 713/185 |
| 2006/0282880 A1 * | 12/2006 | Haverinen | .......... | H04L 63/1458 726/3 |
| 2008/0189768 A1 * | 8/2008 | Callahan | ............... | H04L 63/105 726/4 |
| 2012/0054834 A1 * | 3/2012 | King | ...................... | G06F 21/31 726/4 |

* cited by examiner

*Primary Examiner* — Harris C Wang
(74) *Attorney, Agent, or Firm* — Holland & Hart LLP

(57) ABSTRACT

A computer-implemented method for selectively authenticating a request based on an authentication policy is described. A request is received from a client. A determination is made as to which authentication threshold is applied to the request based on an authentication policy. The request is authenticated if the authentication threshold is satisfied. The authentication threshold is modified if the request is not successfully authenticated.

19 Claims, 8 Drawing Sheets

SYSTEMS AND METHODS FOR SELECTIVELY AUTHENTICATING QUERIES BASED ON AN AUTHENTICATION POLICY

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors.

Computer systems may function as information management systems. For example, a server may provide information about files or other data to client computer systems. A client may send a request to a server querying whether a particular file is malicious or non-malicious. In addition, the client may request information from the server regarding a particular website. The back-end (i.e., server) may perform an analysis of the files, websites, data, etc., in order to provide a response to the client.

Malicious users of computer systems may desire to query a back-end server to gather information about a particular file. The back-end server may prevent a malicious-motivated query by authenticating the various requests that are received. Currently, client authentication schemes (such as cryptographic key and token schemes) may be implemented to authenticate a request received from a client. Authenticating a high level of requests, however, may cause the performance of the server to decrease. Current authentication schemes may require computational effort on the server to validate a request. Responses to legitimate requests may be delayed if the load on the server from validating millions of requests is too high. As a result, benefits may be realized by providing system and methods for selectively authenticating queries based on an authentication policy.

SUMMARY

According to at least one embodiment, a computer-implemented method for determining when to authenticate a request based on an authentication policy is described. A request may be received from a client. A determination may be made as to which authentication threshold is applied to the request based on an authentication policy. The request may be authenticated if the authentication threshold is satisfied. The authentication threshold may be modified if the request is not successfully authenticated.

In one embodiment, an authentication token may be provided to the client. The token may accompany the request received from the client. In one example, an identifier of the client may be compared against a blacklist of client identifiers.

The authentication threshold may be modified for a predetermined period of time if the request is not successfully authenticated. In one embodiment, a response to the request may be transmitted if the authentication threshold is not satisfied. The request may be ignored if the request is not successfully authenticated.

In one embodiment, the authentication threshold may specify a probability value that the request is authenticated. The probability value to authenticate requests may be increased for a predetermined time period if the current request is not successfully authenticated. In another embodiment, the probability value to authenticate requests may be decreased if requests are authenticated successfully during the predetermined time period.

In one configuration, the authentication threshold includes a range of Internet Protocol (IP) addresses. The authentication threshold may also be a function of a string of bytes included in the request.

A computer system configured to determine when to authenticate a request based on an authentication policy is also described. The computer system may include a processor and memory in electronic communication with the processor. The system may also include a connection interface configured to receive a request from a client, and a policy analyzer configured to determine which authentication threshold to apply to the request based on an authentication policy. The system may further include a request authenticator configured to authenticate the request if the authentication threshold is satisfied. In addition, the system may include a threshold modifier configured to modify the authentication threshold if the request is not successfully authenticated.

A computer-program product for determining when to authenticate a request based on an authentication policy is also described. The computer-program product may include a computer-readable medium having instructions thereon. The instructions may include code programmed to receive a request from a client, and code programmed to determine an authentication threshold to apply to the request based on an authentication policy. The instructions may also include code programmed to authenticate the request if the authentication threshold is satisfied. In addition, the instructions may include code programmed to modify the authentication threshold if the request is not successfully authenticated.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
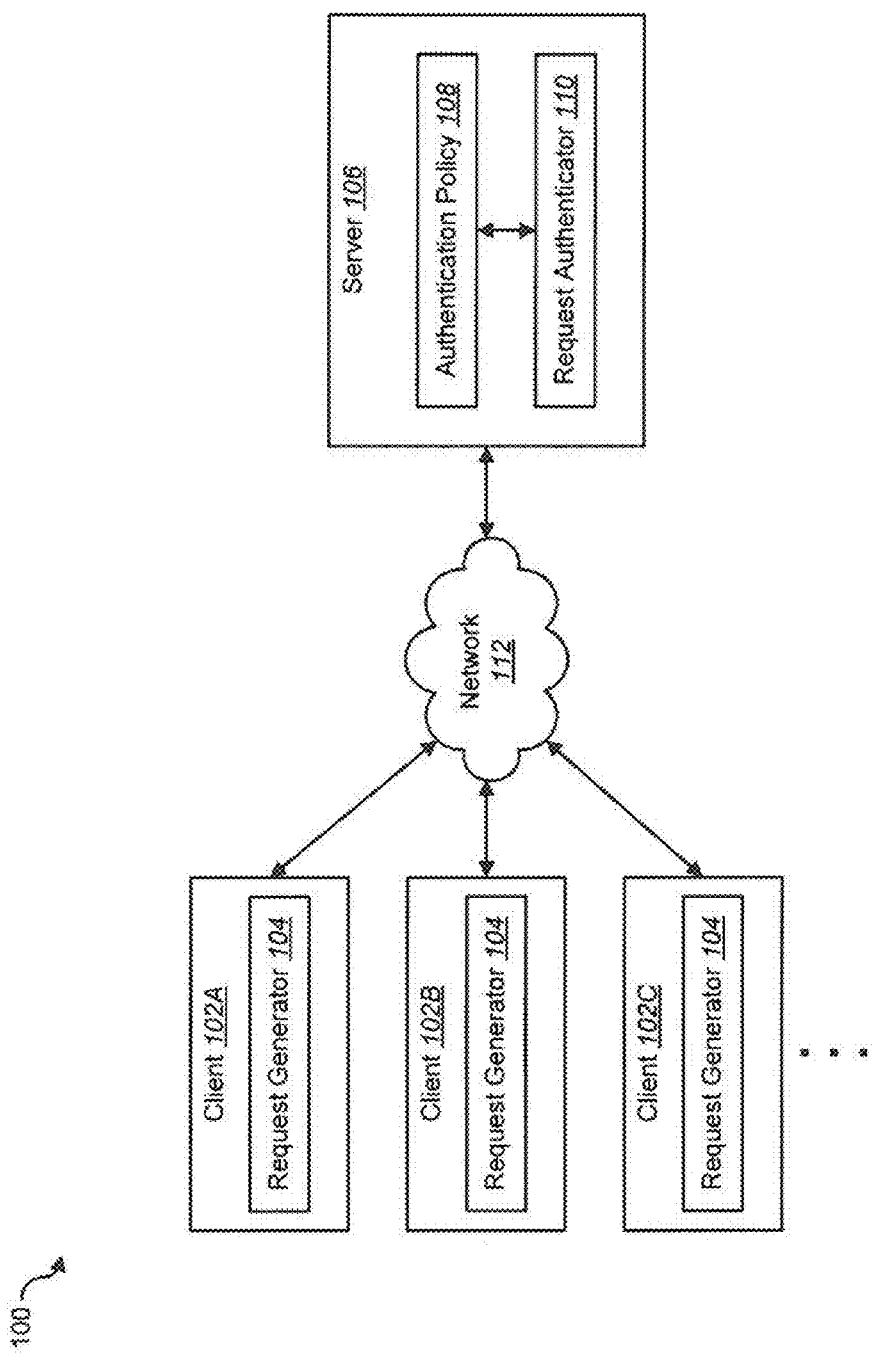
FIG. 1 is a block diagram illustrating one embodiment of a client-server environment in accordance with the present systems and methods.

While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Providers of information management services may provide clients with information regarding a particular file, website, etc. These services allow users to make queries to the provider's back-end servers and receive responses to such queries. These services, however, have a number of challenges. For example, one challenge is that a malicious user may attempt to scrape a database on the back-end server through repeated queries. Another challenge may be a malicious user attempting to provide a corrupted file to the back-end server so that the server places the file on a whitelist. Current solutions, such as Internet Protocol (IP) address throttling, fail in the presence of network address translation (NAT) devices and Internet Service Providers (ISPs) whose IP address range may be small. More sophisticated solutions involving the use of cryptographic signing and/or authentication of requests may require computational overhead on the back-end. The present systems and methods provide for efficient authentication of requests to prevent large-scale database scraping and other attacks on the back-end.

FIG. 1 is a block diagram illustrating one embodiment of a client-server environment 100 in accordance with the present systems and methods. In one embodiment, three clients 102A, 102B, 102C are illustrated. More or less than three clients may be included in the client-server environment 100. The clients 102A, 102B, 102C may be a personal computer, a laptop, a personal digital assistant (PDA), a mobile communications device, or any other type of computing device.

In one embodiment, the clients 102A, 102B, 102C may include a request generator 104. The generator 104 may generate a request that is transmitted to a back-end server 106. The request may be transmitted over a network connection 112 between the clients 102A, 102B, 102C, and the server 106. In one embodiment, the request may be a request for information about a particular file, website, etc. In one embodiment, the server 106 may analyze the files, websites, etc., and provide a response. In one embodiment, the request may be a request to provide information. For example, the request may be a request to add a file, uniform resource locator (URL), etc., to a whitelist that is maintained by the back-end server 106.

In one embodiment, the server 106 may include an authentication policy 108 and a request authenticator 110. The policy 108 may include rules or settings that specify which requests received from the clients 102A, 102B, 102C are to be authenticated by the authenticator 110. For example, the authentication policy 108 may specify that 10% of the requests received are to be authenticated. The policy 108 may be dynamically modified if a received request that is selected for authentication is not validated by the authenticator 110.

Figure 2:
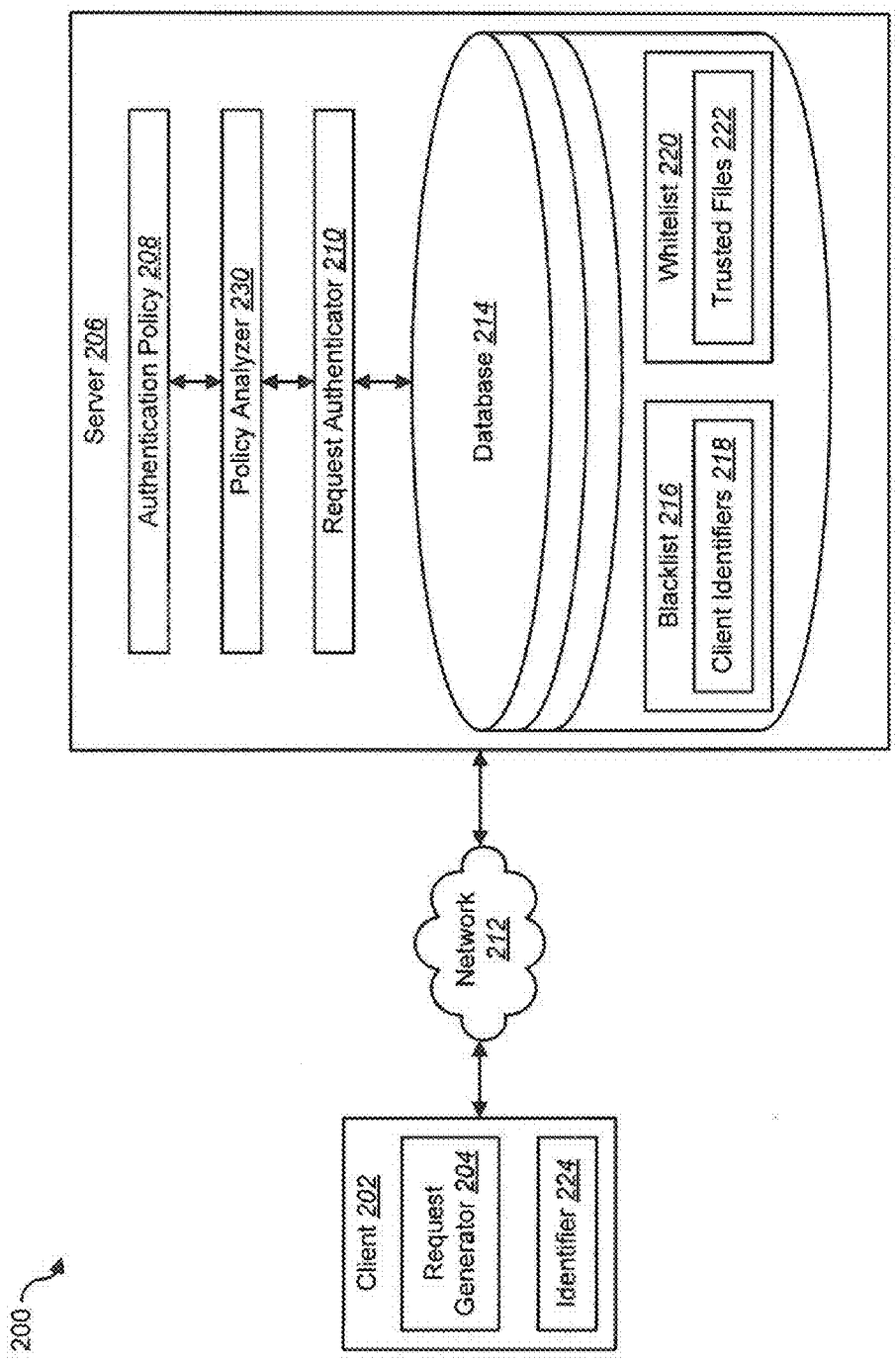
FIG. 2 is a block diagram illustrating another embodiment of a client-server environment in accordance with the present systems and methods.

FIG. 2 is a block diagram illustrating another embodiment of a client-server environment 200 in accordance with the present systems and methods. In one example, a client 202 may include a request generator 204 that generates a request. The request may be sent to a server 206 via a network connection 212. In one embodiment, the client 202 may include an identifier 224. The identifier 224 may be sent to the server 206 with the request. The identifier 224 may be the IP address of the client 202 that sent the request.

In one embodiment, the server 106 may include an authentication policy 208, a policy analyzer 230, a request authenticator 210, and a database 214. In one configuration, the database 214 may include a blacklist 216 and a whitelist 220. The blacklist 216 may include a list of client identifiers 218. The client identifiers 218 on the blacklist 216 may be the IP addresses of clients that have engaged in malicious activities. The whitelist 220 may include a list of trusted files 222. The files on the whitelist 220 may be files that are known to be non-malicious files. In addition, the whitelist 220 may include a list of IP addresses of clients that are known to be trusted, non-malicious clients.

In one configuration, the authentication policy 208 may include rules or settings that may indicate whether a request should be authenticated. The policy analyzer 230 may analyze the policy 208 to determine whether the received request should be selected to be authenticated. The request authenticator 210 may perform an authentication procedure to validate a received request that has been selected by the analyzer 230. The authenticator 210 may implement any sort of authentication or token schemes, such as a cryptographic schemes, to authenticate the request.

Figure 3:
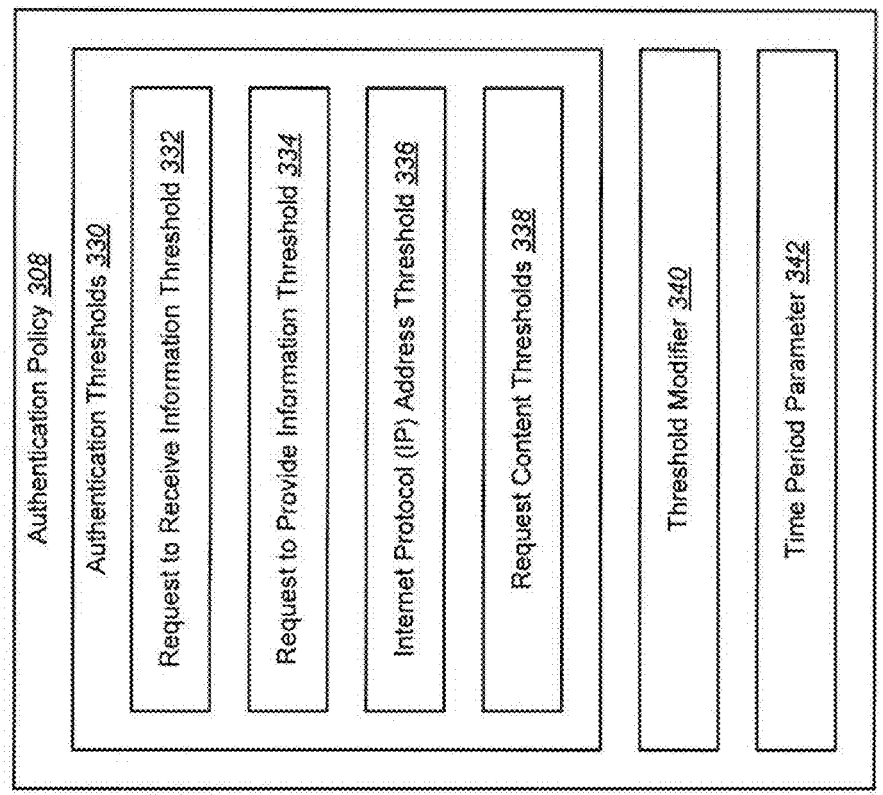
FIG. 3 is a block diagram illustrating one embodiment of an authentication policy.

FIG. 3 is a block diagram illustrating one embodiment of an authentication policy 308. The policy 308 may provide settings that determine whether a particular request received from a client should be authenticated. As explained above, the authentication policy 308 may be stored on a back-end server 106. In another embodiment, the policy 308 may be stored remotely to the server 106.

In one configuration, the authentication policy 308 may include authentication thresholds 330, a threshold modifier 340, and a time period parameter 342. The authentication thresholds 330 may include a request to receive information threshold 332, a request to provide information threshold 334, an IP address threshold 336, and request content thresholds 338. The request to receive information threshold 332 may be applied to requests for information received from a client 102. For example, the request may be for the analysis of a particular file, website, etc. The threshold 332 may indicate how many of these types of requests should be authenticated. For example, the threshold 332 may indicate that 1% of every 1,000 requests for information should be authenticated. In other words, the threshold 332 may indicate that one out of every 1,000 received requests should be selected to be authenticated.

In one embodiment, the request to provide information threshold 334 may be applied to requests to whitelist a particular file, URL, etc. For example, the threshold 334 may indicate that 0.2% of every 500 requests to whitelist a particular file or URL should be authenticated. In other words, the threshold 334 may indicate that one out of every 500 requests to whitelist a certain file or URL should be authenticated.

In one embodiment, the IP address threshold 336 may include a range of IP addresses. A request sent from a client with an IP address that is in this range may be flagged for authentication. The range of IP addresses may be associated with a specific geographic location. Requests sent from clients located in this geographic region may be selected to be authenticated.

In addition, the authentication thresholds 330 may include request content thresholds 338. In one configuration, the content thresholds 338 may indicate that the content of the request may determine whether the request is flagged for authentication. In one embodiment, a query string making up the request may be analyzed to determine whether to authenticate the request. For example, if the request is a query for a file "MD5", the last byte of the "MD5" may determine whether to authenticate the request. Further, if a URL is being queried as the request, a function of the characters of the URL may determine whether to authenticate the request. In one embodiment, the authentication threshold 330 may set different thresholds for different types of queries. For example, queries from certain IP address ranges may be validated with higher probability. Similarly, queries for specific files may be validated less frequently because they may be more likely to be legitimate queries.

The policy 308 may also include a threshold modifier 340. The modifier 340 may modify the settings of the authentication thresholds 330 for a certain time period, defined by a time period parameter 342. For example, the request to receive information threshold 332 may be the active means to determine whether to authenticate a request. In one example, the threshold 332 may specify that one out of every 1,000 requests should be authenticated. If a request flagged for validation fails the authentication procedure, the modifier 340 may modify the threshold 332 so that one out of every 500 requests is now flagged for authentication. The time period parameter 342 may specify the length of time the threshold 332 should be modified. If another request flagged for validation fails the authentication procedure, the modifier 340 may modify the threshold 332 again. For example, the threshold 332 may be modified so that every single request that is received is now flagged for authentication. If the requests are successfully authenticated under the modified threshold 332 for the period specified by the time period parameter 342, the modifier 340 may modify the threshold 332 until it returns to the original settings (in this example, one out of every 1,000 requests).

In another embodiment, when an unknown system file or URL begins to gain popularity, the threshold 332 may be modified so that requests for that particular object (i.e., system file or URL) may be authenticated more frequently. This increase in authentication may prevent gaming of the system.

Figure 4:
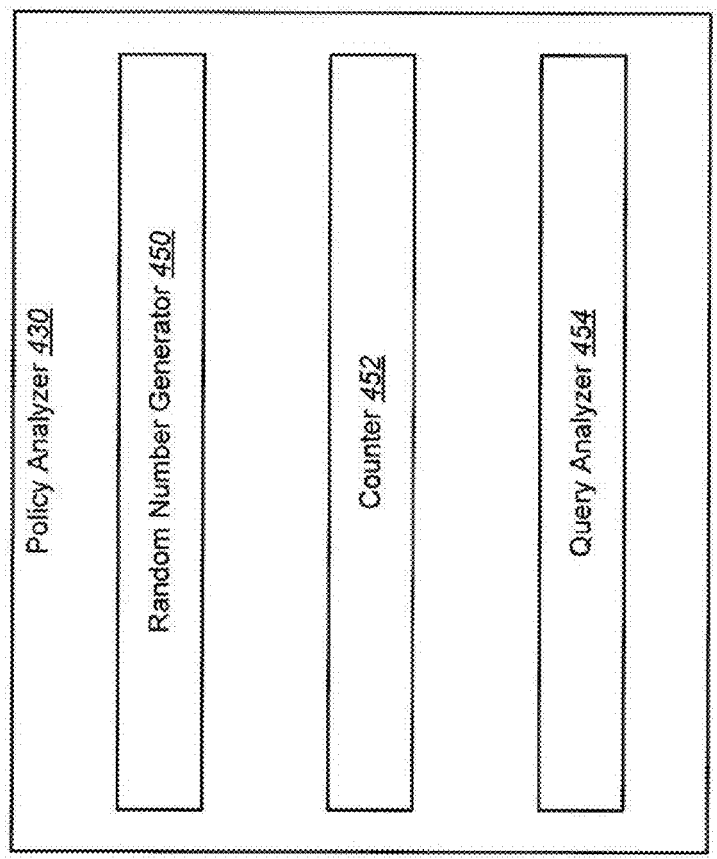
FIG. 4 is a block diagram illustrating one embodiment of a policy analyzer in accordance with the present systems and methods.

FIG. 4 is a block diagram illustrating one embodiment of a policy analyzer 430 in accordance with the present systems and methods. The analyzer 430 may analyze an authentication policy 108 that defines when a request received from a client should be authenticated. In one embodiment, the policy 108 may specify that a request should be authenticated when a random number generator 450 generates a number in a predetermined range. The analyzer 430 may include the random number generator 450 which generates a random number. The analyzer 430 may determine whether the random generated number falls with the range specified by the policy 108.

The policy analyzer 430 may also include a counter 452. As previously explained, the policy 108 may include authentication thresholds 330. The thresholds 330 may specify that one out of every certain number of requests should be authenticated. The counter 452 may be incremented each time a request is received in order to determine which requests should be authenticated. In addition, the policy analyzer 430 may also include a query analyzer 454. The authentication policy 108 may specify that requests should be authenticated based on a string of bytes within the request. The query analyzer 454 may analyze these strings according to a predetermined function in order to determine whether the request should be analyzed.

Figure 5:
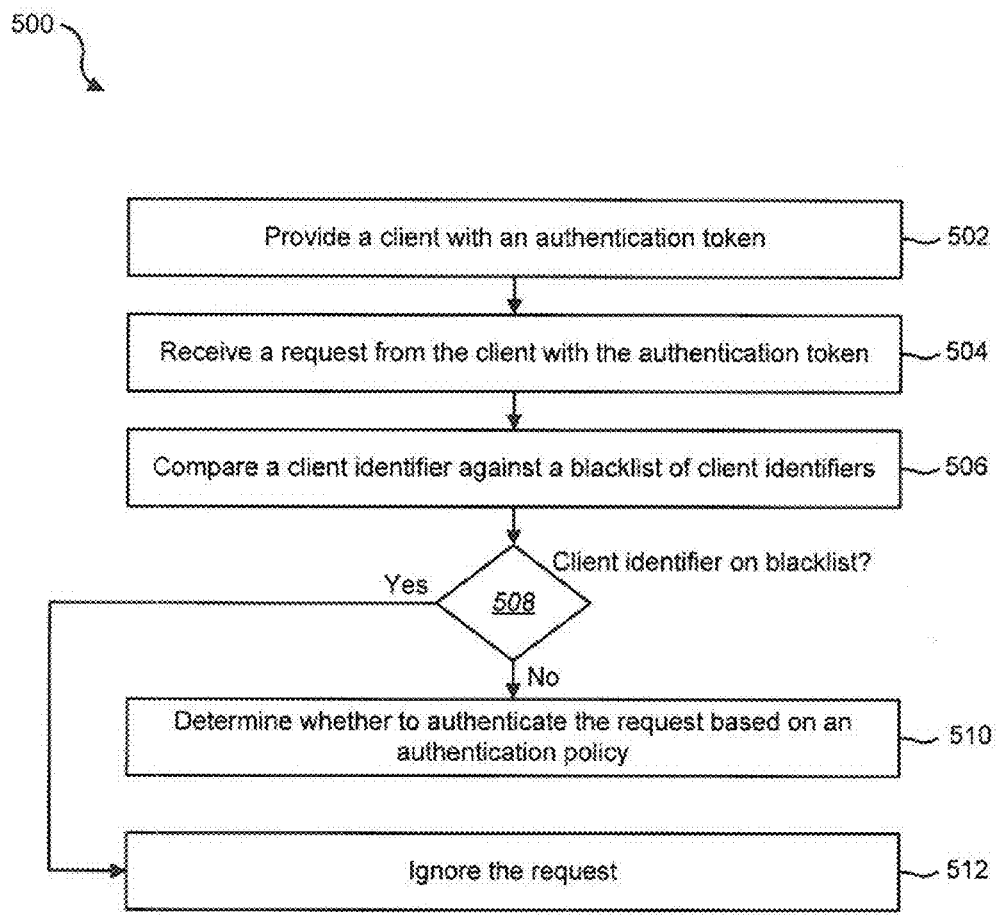
FIG. 5 is a flow diagram illustrating one embodiment of a method for authenticating queries in order to prevent database scraping and tainting attacks.

FIG. 5 is a flow diagram illustrating one embodiment of a method 500 for selectively authenticating queries in order to prevent database scraping and tainting attacks. The method 500 may be implemented by a back-end server 106. In one embodiment, a client 202 may be provided 502 with an authentication token. The token may be a cryptographic key or some other type of authentication token. The token may either accompany requests from the client 202 or may be used to sign these requests. In one configuration, a request may be received 504 from the client 202. The request may be accompanied by the authentication token. In addition, an identifier that identifies the client may accompany the received request 504. The identifier of the client may be compared 506 against a blacklist 216 of client identifiers 218. Clients associated with the identifiers on the blacklist 216 may be clients that may attempt to scrape the database 214 of the server 106 or attack the server 106 in some other way. A determination 508 may be made whether the client identifier is included on the blacklist. If the identifier is on the blacklist 216, the received request may be ignored 512. If the identifier, however, is not on the blacklist 216, the method 500 may proceed to determine 510 whether to authenticate the request based on an authentication policy 108. Details regarding this determination will be described below.

Figure 6:
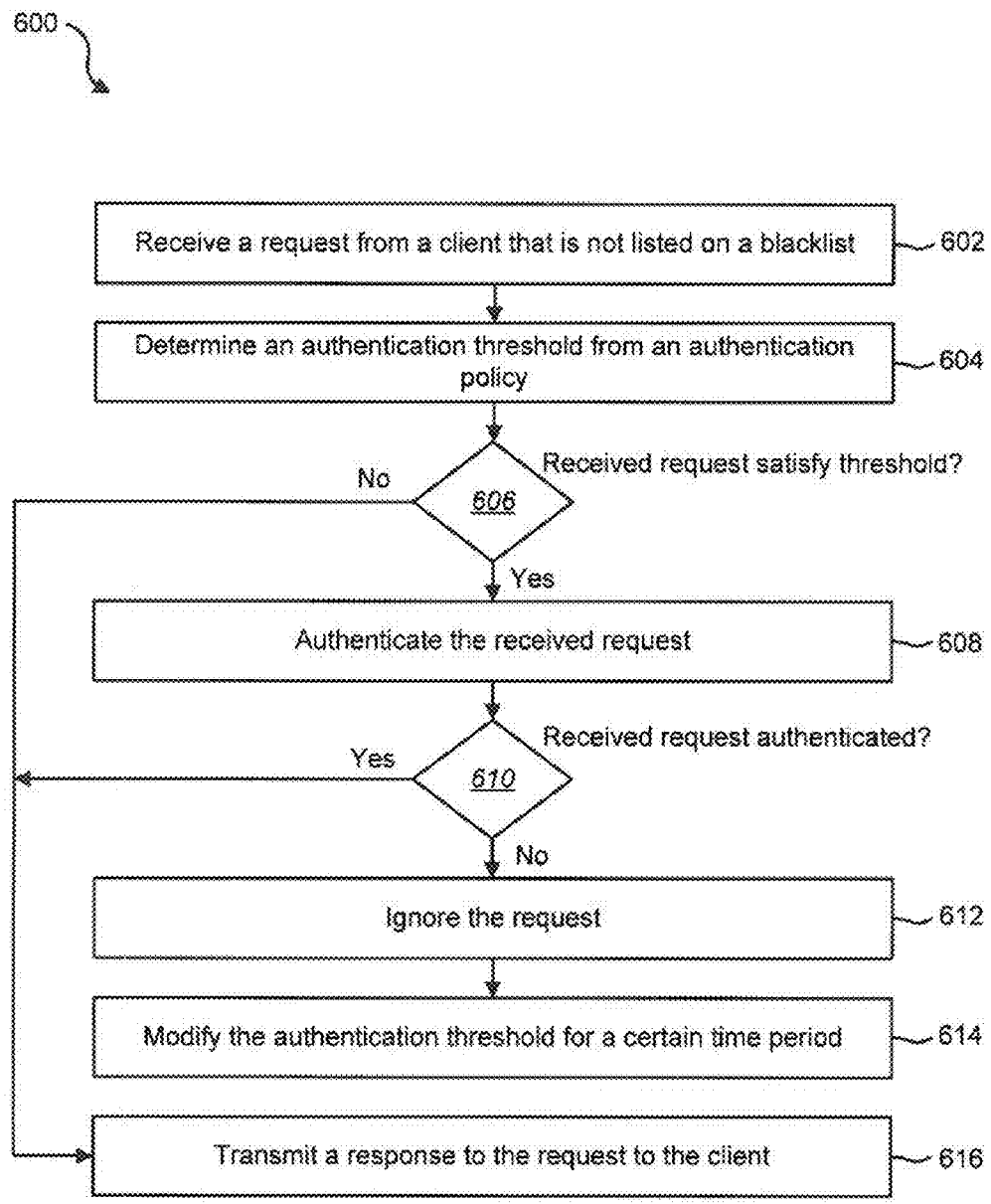
FIG. 6 is a flow diagram illustrating one embodiment of a method for selectively authenticating requests according to an authentication policy.

FIG. 6 is a flow diagram illustrating one embodiment of a method 600 for selectively authenticating requests according to an authentication policy. In one example, the method 600 may be implemented by the back-end server 106. A request may be received 602 from a client. The identity of the client may not be included on a blacklist 216 maintained by the server 106. An authentication threshold 330 from an authentication policy 108 may be determined 604. In other words, it may be determined 604 which authentication threshold 330 should be applied to the received request.

A determination 606 may be made whether the received request satisfies the authentication threshold 330. If the request does not satisfy the threshold, a response to the request may be transmitted 616 to the client. If it is determined 606 that the request does satisfy the threshold, the received request may be authenticated 608. For example, the authentication policy may indicate that one our of every 1,000 requests for information should be authenticated. If the received request is not selected to be authenticated, a response to the request may be transmitted back to the client. If, however, the request is selected to be authenticated, an authentication scheme may be implemented to validate the request.

In one embodiment, a determination 610 may be made whether the request has been successfully authenticated. If the request has been successfully validated, a response to the request may be transmitted 616 to the client. If, however, the request is not successfully authenticated, the request may be ignored 612. In addition, the authentication threshold 330 may be modified 614 for a certain time period. In one embodiment, the threshold may be modified 614 so that every request is now authenticated. In another embodiment, the threshold may be modified 614 by gradually decreasing the threshold. For example, the threshold may be modified from one out of every 1,000 request to one out of every 500 requests.

Figure 7:
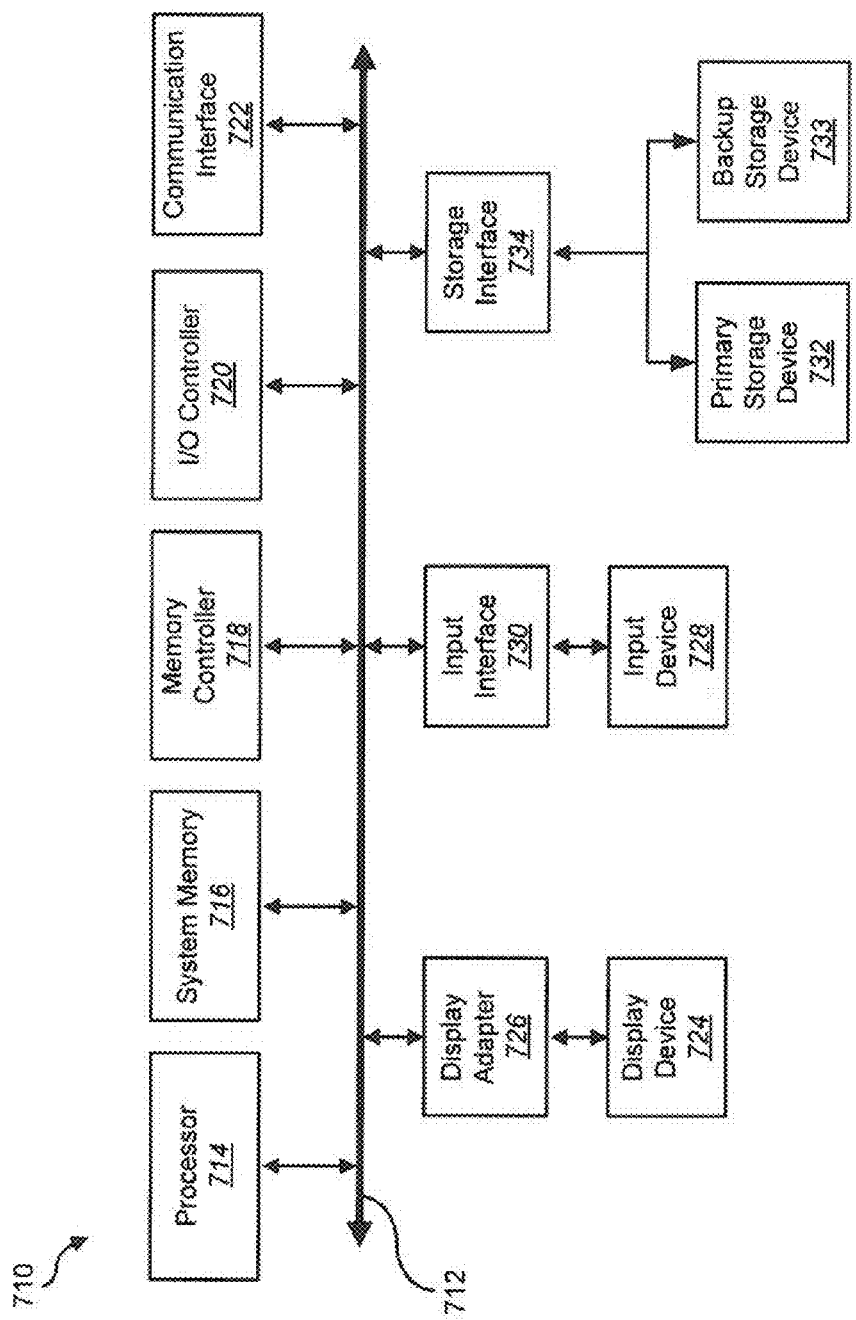
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may comprise at least one processor 714 and system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the receiving, determining, authenticating, and modifying steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may comprise both a volatile memory unit (such as, for example, system memory 716) and a non-volatile storage device (such as, for example, primary storage device 732, as described in detail below).

In certain embodiments, exemplary computing system 710 may also comprise one or more components or elements in addition to processor 714 and system memory 716. For example, as illustrated in FIG. 7, computing system 710 may comprise a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller 718 may perform and/or be a means for performing, either alone or in combination with other elements, one or more of the steps or features described and/or illustrated herein, such as receiving, determining, authenticating, and modifying.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for receiving, determining, authenticating, and modifying steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network comprising additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the receiving, determining, authenticating, and modifying steps disclosed herein. Communication interface 722 may also be used to perform and/or be a means for performing other steps and features set forth in the instant disclosure.

As illustrated in FIG. 7, computing system 710 may also comprise at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also comprise at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the receiving, determining, authenticating, and modifying steps disclosed herein. Input device 728 may also be used to perform and/or be a means for performing other steps and features set forth in the instant disclosure.

As illustrated in FIG. 7, exemplary computing system 710 may also comprise a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also comprise other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Storage devices 732 and 733 may also be used, for example, to perform and/or be a means for performing, either alone or in combination with other elements, one or more of the receiving, determining, authenticating, and modifying steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
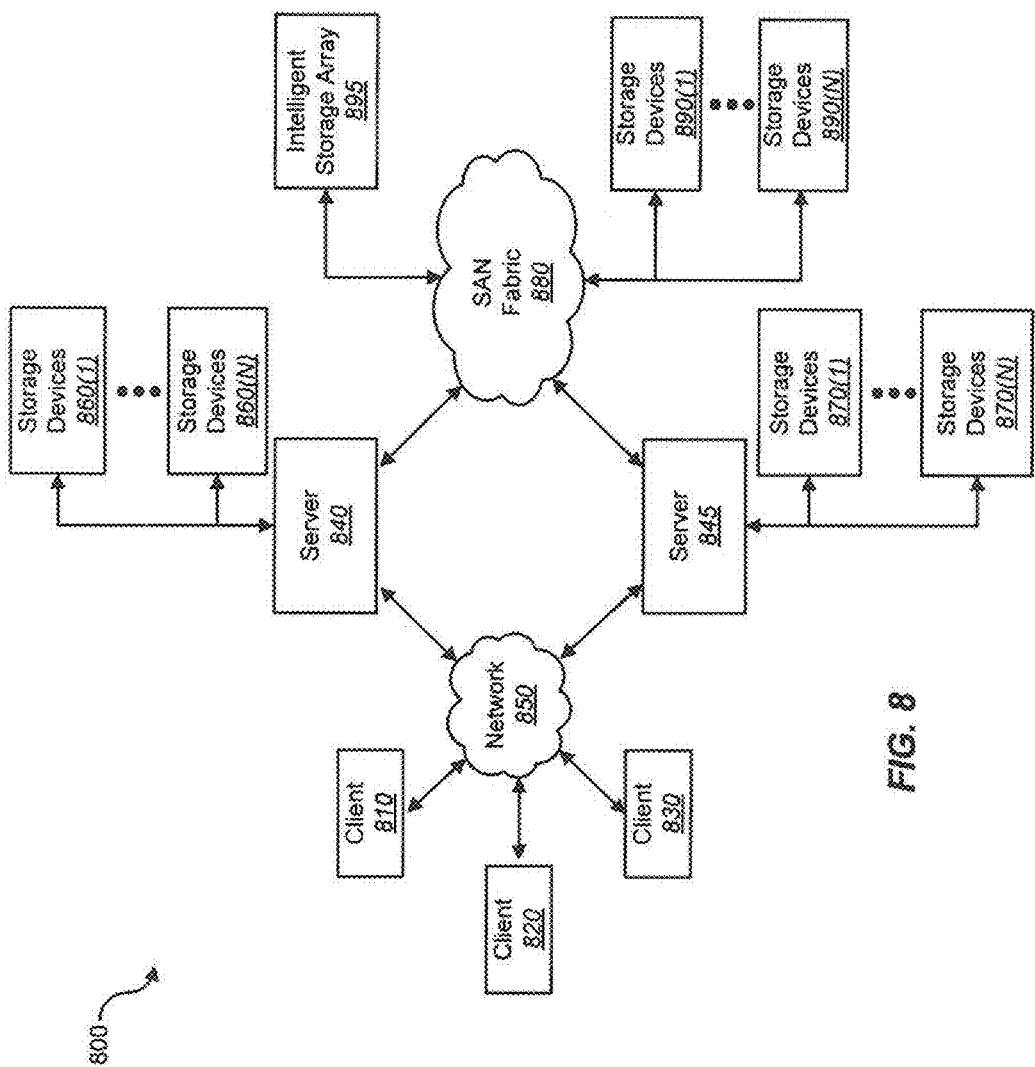
FIG. 8 is a block diagram of an exemplary network architecture in which client systems and servers may be coupled to a network.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or to run certain software applications. Network 850 generally represents any telecommunication or computer network; including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the receiving, determining, authenticating, and modifying steps disclosed herein. Network architecture 800 may also be used to perform and/or be a means for performing other steps and features set forth in the instant disclosure.

As detailed above, computing system 710 and/or one or more of the components of network architecture 800 may perform and/or be a means for performing, either alone or in combination with other elements, one or more steps of the exemplary methods described and/or illustrated herein. For example, computing system 710 and/or one or more of the components of network architecture 800 may perform and/or be a means for performing a computer-implemented method for determining when to authenticate a request based on an authentication policy that may comprise: 1) receiving a request from a client, 2) determining an authentication threshold to apply to the request based on an authentication policy, 3) authenticating the request if the authentication threshold is satisfied, and then 4) modifying the authentication threshold if the request is not successfully authenticated.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for selectively authenticating a request based on an authentication policy, comprising:
   receiving, by a hardware processor on a server, a request from a client, the request comprising, at least in part, a request for the client to access a file or website via the server;
   determining, by the hardware processor, an authentication threshold to apply to the request based on an authentication policy, wherein the authentication threshold is determined based at least in part on a string of bytes included in the request;
   authenticating, by the hardware processor, the request if the authentication threshold is satisfied, the authentication threshold specifying 1 out of every N requests is authenticated, N being a value greater than 1;
   determining, by the hardware processor, whether the request received from the client is successfully authenticated; and
   upon determining that the authentication of the request received from the client is unsuccessful, modifying, by the hardware processor on the server, the authentication threshold, the modified authentication threshold specifying 1 out of every M requests is authenticated, M being a value other than N and greater than 1.

2. The method of claim 1, further comprising providing an authentication token to a client, wherein the token accompanies the request.

3. The method of claim 1, further comprising comparing an identifier of the client against a blacklist of client identifiers.

4. The method of claim 1, wherein the authentication threshold is modified for a predetermined period of time.

5. The method of claim 1, further comprising transmitting a response to the request if the authentication threshold is not satisfied.

6. The method of claim 1, further comprising ignoring the request if the request is not successfully authenticated.

7. The method of claim 1, wherein the authentication threshold specifies a probability value that the request is authenticated.

8. The method of claim 7, further comprising increasing the probability value to authenticate requests for a predetermined time period if the current request is not successfully authenticated.

9. The method of claim 8, further comprising decreasing the probability value to authenticate requests if requests are authenticated successfully during the predetermined time period.

10. The method of claim 1, wherein the authentication threshold comprises a range of Internet Protocol (IP) addresses.

11. A computer system configured to selectively authenticate a request based on an authentication policy, comprising:
- a processor;
- memory in electronic communication with the processor;
- a connection interface configured to receive a request from a client, the request comprising, at least in part, a request for the client to access a file or website via a server;
- a policy analyzer configured to determine which authentication threshold to apply to the request based on an authentication policy, wherein the authentication threshold is determined based at least in part on a string of bytes included in the request;
- a request authenticator configured to authenticate the request if the authentication threshold is satisfied, wherein the authentication threshold specifies 1 out of every N requests is authenticated, N being a value greater than 1, and wherein the request authenticator determines whether the request received from the client is successfully authenticated; and
- a threshold modifier configured to modify the authentication threshold upon determining that the authentication of the request received from the client is unsuccessful, the modified authentication threshold specifying 1 out of every M requests is authenticated, M being a value other than N and greater than 1.

12. The computer system of claim 11, wherein the connection interface is further configured to provide an authentication token to a client, wherein the token accompanies the received request.

13. The computer system of claim 11, wherein the request authenticator is further configured to compare an identifier of the client against a blacklist of client identifiers.

14. The computer system of claim 11, wherein the authentication threshold is modified for a predetermined period of time.

15. The computer system of claim 11, wherein the connection interface is further configured to transmit a response to the request if the authentication threshold is not satisfied.

16. The computer system of claim 11, wherein the authentication threshold specifies a probability value that the request is authenticated.

17. The computer system of claim 11, wherein the threshold modifier is further configured to increase the probability value to authenticate requests for a predetermined time period if the current request is not successfully authenticated.

18. The computer system of claim 17, wherein the threshold modifier is further configured to decrease the probability value to authenticate requests if requests are authenticated successfully during the predetermined time period.

19. A computer-program product for selectively authenticating a request based on an authentication policy, the computer-program product comprising a non-transitory computer-readable storage medium having instructions thereon, the instructions comprising:
- code programmed to receive a request from a client, the request comprising, at least in part, a request for the client to access a file or website via a server;
- code programmed to determine an authentication threshold to apply to the request based on an authentication policy, wherein the authentication threshold is determined based at least in part on a string of bytes included in the request;
- code programmed to authenticate the request if the authentication threshold is satisfied, the authentication threshold specifying 1 out of every N requests is authenticated, N being a value greater than 1;
- code programmed to determine whether the request received from the client is successfully authenticated; and
- upon determining that the authentication of the request received from the client is unsuccessful, code programmed to modify the authentication threshold, the modified authentication threshold specifying 1 out of every M requests is authenticated, M being a value other than N and greater than 1.

* * * * *